May 22, 1934.
F. X. GOVERS
1,959,714
VACUUM DISTILLATION OF LIQUIDS
Filed July 13, 1933
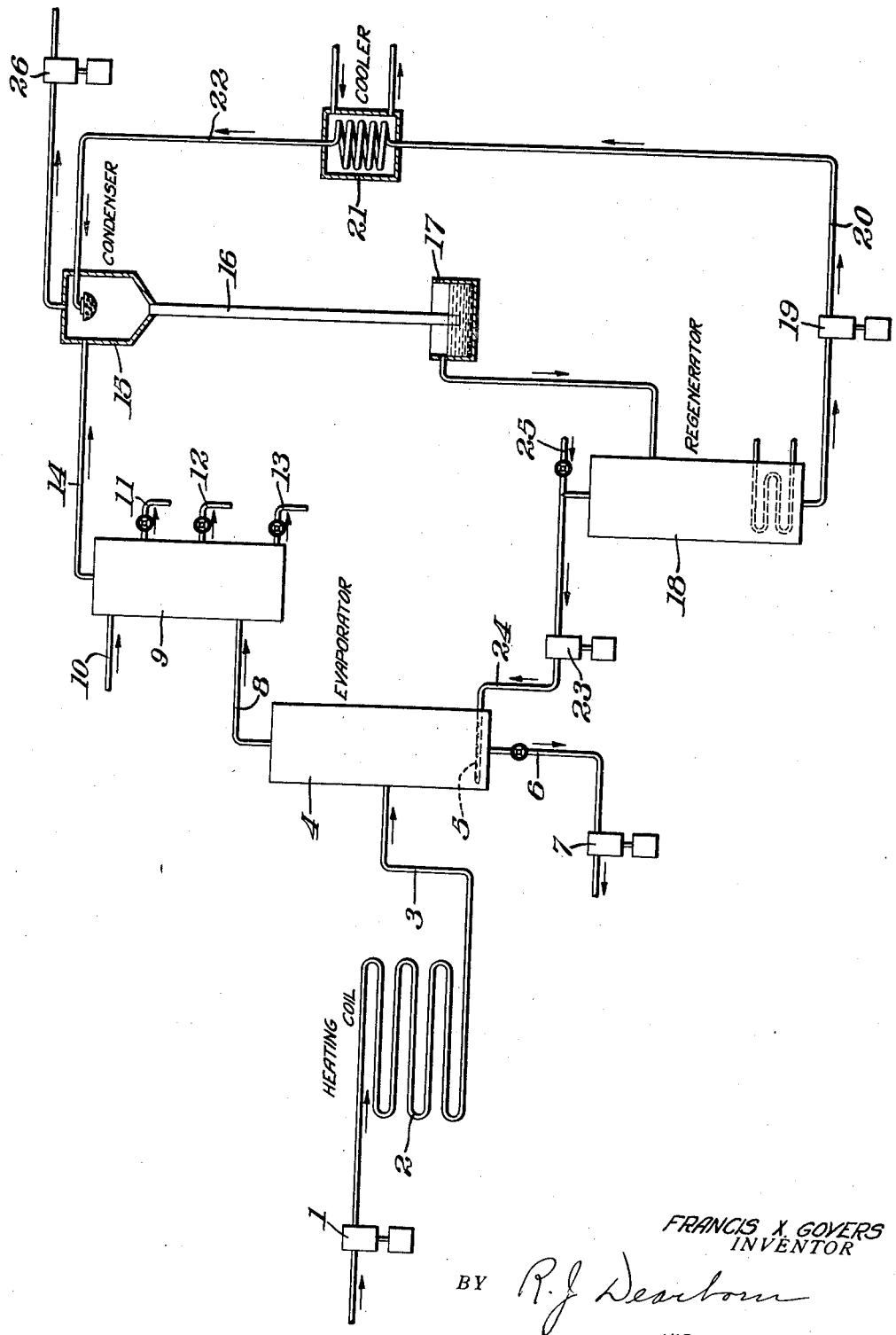
FRANCIS X. GOVERS
INVENTOR
BY R. J. Dearborn
HIS ATTORNEY Patented May 22, 1934

1,959,714

UNITED STATES PATENT OFFICE 1,959,714

VACUUM DISTILLATION OF LIQUIDS

Francis X. Govers, Vincennes, Ind., assignor to The Indian Refining Company, Lawrenceville, Ill., a corporation of Maine Application July 13, 1933, Serial No. 680,175

8 Claims. (Cl. 196—77)

This invention relates to distillation and particularly to distillation of liquids under low absolute pressures.

The invention contemplates a method of distilling liquids under a low absolute pressure comprising distilling a liquid in a distilling zone in the presence of a gaseous distilling agent adapted to assist the distillation, conducting the vapors evolved in the distilling zone and comprising distillate and distilling agent to a condensing zone, condensing and separating the distillate therefrom, and absorbing the distilling agent in a material with which it chemically combines to form compounds which are comparatively stable at atmospheric temperature and which have a negligible vapor pressure whereby a low absolute pressure can be maintained within the distilling and condensing zones.

The invention is adapted to the distillation of mineral oil. It is of particular advantage in the vacuum distillation of mineral lubricating oil fractions where it is desired to obtain a maximum yield of distillate without subjecting the oil to the destructive influence of high temperatures. By means of this invention oil may be distilled under a low absolute pressure in the neighborhood of a few millimeters of mercury and in the presence of a vaporous distilling medium substantially regardless of the seasonal fluctuations in atmospheric conditions.

Vacuum distillation of lubricating oil stocks is ordinarily carried out in the presence of steam. In that case steam is therefore the final condensate removed from the system. In a closed vacuum distilling system, the vapor pressure of this condensed steam, accumulating in the final condenser or receiver, controls the degree of pressure prevailing within the system. The lower the temperature to which such condensate can be cooled, the lower its vapor pressure and thus the lower the absolute pressure prevailing within the system.

The temperature to which the final condensate may be cooled in commercial operations is usually entirely dependent upon the prevailing temperature of the available supply of cooling water. In many localities during the summer months, the temperature of the water available for cooling purposes is not lower than 90° to 100° F. so that, under these conditions, it is seldom possible to maintain an absolute pressure of less than 2" or 3" of mercury when distilling under vacuum in the presence of steam.

The purpose of the present invention is to provide means for depressing the vapor pressure of the distilling agent in the final condenser after separation of the distillate so that a low absolute pressure of in the neighborhood of two or three millimeters of mercury, or even less, may be maintained within the distilling and condensing zones regardless of the temperature of the available cooling liquids.

Accordingly, my invention comprises the distillation of liquids, such as mineral lubricating oil fractions under low absolute pressure in the presence of a distilling agent, such as carbon dioxide for example, and after separation of the evolved distillate from the carbon dioxide, reacting the carbon dioxide with a material, such as triethanolamine, and with which the carbon dioxide reacts to form a definite chemical compound characterized by having a relatively low vapor pressure.

Carbon dioxide is believed to combine with triethanolamine to form both a carbonate and bicarbonate. That is, triethanolammonium carbonate is formed as the first product in the reaction of carbon dioxide with a triethanolamine solution. The resulting carbonate then reacts with further carbon dioxide to form triethanolamine bicarbonate. A relatively large volume of carbon dioxide may be combined with a unit volume of triethanolamine to form the foregoing compounds at ordinary atmospheric temperatures. The resulting bicarbonate compound while stable at ordinary temperatures is readily decomposed by heating to temperatures of around 100° C. whereupon the carbon dioxide is quantitatively released, leaving a solution containing essentially triethanolamine carbonate which is in suitable form for the absorption of, or reaction with further carbon dioxide.

The invention will now be described in connection with the accompanying drawing forming a part of this specification but not limiting the invention.

Mineral lubricating oil stock, which is to be distilled, is drawn from a source not shown by a pump 1 and conducted through a heating coil 2, wherein it may be heated to a suitable distilling temperature, for example, around 600° or 700° F., depending upon the nature of the oil. The heated oil is then delivered through a pipe 3 to an evaporator 4 wherein vaporization and distillation occurs.

Vaporization within the evaporator is aided, in this instance, by the introduction, to the bottom of the evaporator, of carbon dioxide through a spray 5. The source of the carbon dioxide thus admitted will be explained later.

The unvaporized portion of the oil collecting in the bottom of the evaporator 4 is withdrawn through a pipe 6 by a pump 7 for such further disposition as may be desired.

The vapors evolved therein together with the carbon dioxide are removed through a pipe 8 to the lower portion of a fractional condenser 9. The upper part of the fractional condenser may be provided with a cooling coil or with refluxing means to which cooling liquid may be supplied through a pipe 10. In this way, condensation of the distilled vapors is effected within the condenser 9 into a series of fractions as desired, which may be removed from the fractional condenser through successive pipe connections 11, 12 and 13. The pipes 11, 12 and 13 advantageously communicate with individual pumps adapted to withdraw the liquid from the condenser and discharge it therefrom against atmospheric pressure.

The uncondensed carbon dioxide is removed from the top of the fractional condenser 9 through a pipe 14 and conducted to a final condenser 15 provided with a barometric leg 16 discharging into a sump 17.

In the condenser 15, the carbon dioxide stream is brought into contact with a solution comprising essentially triethanolamine carbonate.

As already indicated carbon dioxide combines with triethanolamine to form first triethanolamine carboante, and then this resulting carbonate solution reacts with further carbon dioxide to form the bicarbonate of triethanolamine. In the subsequent regeneration of the solution, the bicarbonate is decomposed, releasing carbon dioxide and leaving triethanolamine carbonate in solution so that, during balanced operation, the solution returning and circulating through the condenser 15 is composed essentially of triethanolamine carbonate.

The solution saturated with carbon dioxide passes downwardly through the barometric leg 16 to the sump 17. From the sump 17, it is conducted to a stripper or regenerator 18, wherein the solution is heated to about 212° F. and whereupon carbon dioxide is released, leaving a neutral solution comprising triethanolamine carbonate.

This neutral carbonate solution is withdrawn by a pump 19 and conducted through a pipe 20 to a cooler 21. The generated solution is cooled by heat exchange with water or other cooling liquids to around 100° F. or lower, and is then returned through a pipe 22 to the top of the condenser 15 for reaction with further carbon dioxide.

The reaction of carbon dioxide with triethanolamine solution is quantitative, and during regeneration carbon dioxide is quantitatively released.

The released carbon dioxide is drawn off from the regenerator 18 by a compressor 23 and delivered through a pipe 24 from which it is discharged through the spray 5 into the evaporator 4, previously mentioned.

Thus, the carbon dioxide is substantially completely recovered and continuously recycled through the system. Any additional quantities of carbon dioxide required to make up for the small losses that may occur can be introduced to the system through a pipe 25.

Vacuum is applied to the top of the condenser 15 by means of a pump 26, or other suitable exhausting means. Fixed gases, comprising air for the most part, are exhausted from the condenser by this pump in order to maintain the desired low absolute pressure within the distilling system.

The invention is not restricted to the use of carbon dioxide as a distilling agent since other materials may also be used which are adapted to chemically combine with the liquid material circulated through the condenser 15. Such distilling agents may include sulfur dioxide or hydrogen sulfide, for example.

An important advantage from a commercial standpoint of using a gaseous distilling agent, such as carbon dioxide, in conjunction with a reacting or absorbing medium, such as triethanolamine, resides in the fact that the absorbing medium is regenerated, and the carbon dioxide recovered for further use without supplying heat for vaporization such as would be required in the case of a distilling agent of the nature of steam which must be condensed and recovered in the form of a liquid. The regeneration of triethanolamine, saturated with carbon dioxide, involves merely a simple decomposition wherein the carbon dioxide is liberated and the remaining solution requires no concentration to restore it to its original condition.

While triethanolamine has been described in connection with the above example, it is contemplated that other amine compounds or organic nitrogen compounds having the ability to combine with the distilling agent and form a solution or mixture having relatively low vapor pressure may be employed.

The invention, of course, is not necessarily restricted to the distillation of mineral oils but may also be applied to the distillation of any type of liquid or other material which it is required to distill under diminished pressures.

Obviously many modifications and variations of the invention, as hereinbefore set forth, may be made without departing from the spirit and scope thereof, and therefore only such limitations should be imposed as are indicated in the appended claims.

I claim:

1. A method of high vacuum distillation which comprises distilling liquid under a low absolute pressure in a distilling zone in the presence of a gaseous distillant, conducting the evolved vapors consisting of distillate and distillant to a condensing zone, condensing and separating the distillate, and reacting the gaseous distillant with a material to form therewith a denite chemical compound characterized by having a low vapor pressure whereby a low absolute pressure is maintained within the condensing and distilling zones.

2. A method of high vacuum distillation which comprises distilling liquid under a low absolute pressure in a distilling zone in the presence of a distillant selected from the group of acidic gases comprising carbon dioxide, sulfur dioxide and hydrogen sulfide, conducting the evolved vapors consisting of a distillate and distillant to a condensing zone, condensing and separating the distillate, and absorbing the distillant in an organic nitrogen compound to chemically react therewith and form a compound having a low vapor pressure whereby a low absolute pressure is maintained within the condensing and distilling zones.

3. The method of distilling hydrocarbon oil under low absolute pressure which comprises distilling the oil in the presence of carbon dioxide, conducting the evolved vapors consisting of distillate oil and carbon dioxide to a condensing zone, condensing and separating the distillate oil, absorbing the carbon dioxide in a solution comprising an organic nitrogen compound to chemically combine therewith and form a compound having a low vapor pressure whereby a low absolute pressure is maintained within the condensing and distilling zones.

4. The method of distilling oil under low absolute pressure which comprises distilling the oil in the presence of carbon dioxide, conducting the evolved vapors consisting of distillate oil and carbon dioxide to a condensing zone, condensing and separating the distillate oil, and absorbing the carbon dioxide in a solution comprising essentially triethanolamine to chemically combine therewith and form a compound having a low vapor pressure whereby a low absolute pressure is maintained within the condensing and distilling zones.

5. A continuous method of distilling hydrocarbon oil under low absolute pressure comprising distilling the oil in a distilling zone in the presence of a gaseous distilling agent comprising essentially carbon dioxide, conducting the evolved vapors consisting of distillate oil and distillant to a condensing zone, condensing and separating the distillate oil, absorbing the distillant in a solution composed essentially of triethanolamine and with which it combines chemically to form a compound having a low vapor pressure, continuously withdrawing the resulting solution from the condensing zone, subjecting it to heating to decompose the resulting compound and to liberate the absorbed distillant for use in distilling further oil, cooling the regenerated solution, and returning it to absorb further quantities of the distillant.

6. A continuous method of distilling hydrocarbon oil under low absolute pressure comprising distilling the oil in a distilling zone in the presence of a gaseous distilling agent comprising essentially carbon dioxide, conducting the evolved vapors consisting of distillate oil and distillant to a primary condensing zone, condensing and separating the distillate oil, conducting the remaining distillant to a secondary condensing zone, bringing the distillant into intimate contact with a solution composed essentially of triethanolamine and with which it combines chemically to form a liquid compound having a low vapor pressure, withdrawing the resulting liquid from the secondary condensing zone, subjecting it to heating to liberate the absorbed distillant for use in distilling further oil and to regenerate the solution, cooling the regenerated solution, and returning it to chemically absorb further distillant.

7. In the distillation of liquid in the presence of a gaseous distillant in a distilling zone maintained under a reduced pressure less than atmospheric wherein vapors are evolved composed of distillate and distillant, the step of reacting the distillant, evolved with the distillate, with a material to form therewith a definite chemical compound characterized by having a low vapor pressure to thereby facilitate maintaining a low absolute pressure within the distilling zone.

8. In the distillation of liquid in the presence of a distillant of the character of carbon dioxide, sulphur dioxide and hydrogen sulphide in a distilling zone maintained under a reduced pressure less than atmospheric wherein vapors are evolved composed of distillate and distillant, the step of absorbing the distillant, evolved with the distillate, in a solution comprising essentially triethanolamine to chemically combine therewith and form a compound having a low vapor pressure to thereby facilitate maintaining a low absolute pressure within the distilling zone.

FRANCIS X. GOVERS.